United States Patent
Schenk (10) Patent No.: US 7,050,487 B2
(45) Date of Patent: May 23, 2006

(54) METHOD AND CIRCUIT ARRANGEMENT FOR DETERMINATION OF TRANSMISSION PARAMETERS

(75) Inventor: Heinrich Schenk, München (DE)

(73) Assignee: Infineon Technologies AG, München (DE)

( * ) Notice: Subject to any disclaimer, the term of this patent is extended or adjusted under 35 U.S.C. 154(b) by 0 days.

(21) Appl. No.: 10/485,064

(22) PCT Filed: May 14, 2003

(86) PCT No.: PCT/EP03/05055

§ 371 (c)(1),
(2), (4) Date: Oct. 7, 2004

(87) PCT Pub. No.: WO03/107558

PCT Pub. Date: Dec. 24, 2003

(65) Prior Publication Data

US 2005/0063323 A1    Mar. 24, 2005

(30) Foreign Application Priority Data

Jun. 13, 2002   (DE) ................................ 102 26 347

(51) Int. Cl.
  *H04B 1/38*   (2006.01)
  *H04B 17/00*  (2006.01)
  *H04B 15/00*  (2006.01)
  *H04L 23/00*  (2006.01)

(52) U.S. Cl. .................... 375/219; 375/224; 375/285; 375/377

(58) Field of Classification Search ................ 375/219, 375/222, 285, 296, 346, 316, 295, 343, 219.2, 375/377, 224; 370/286–291; 379/406.01, 379/406.06, 406.08, 406.09

See application file for complete search history.

(56) References Cited

U.S. PATENT DOCUMENTS

| 4,307,267 | A | | 12/1981 | Peoples |
| 5,206,854 | A | * | 4/1993 | Betts et al. ................. 370/286 |
| 5,943,645 | A | * | 8/1999 | Ho et al. ..................... 704/226 |
| 6,279,022 | B1 | | 8/2001 | Miao et al. |
| 6,300,895 | B1 | | 10/2001 | Carrara et al. |
| 6,430,219 | B1 | * | 8/2002 | Zuranski et al. ............ 375/231 |
| 6,522,688 | B1 | * | 2/2003 | Dowling ..................... 375/222 |
| 6,885,954 | B1 | * | 4/2005 | Jones et al. .................. 702/79 |

FOREIGN PATENT DOCUMENTS

| DE | 695 21 169 T2 | 10/2001 |
| EP | 0 963 057 A2 | 12/1999 |

\* cited by examiner

OTHER PUBLICATIONS

Abstract of EP 0 963 057 A2 in the English language.

*Primary Examiner*—Tesfaldet Bocure
(74) *Attorney, Agent, or Firm*—Maginot, Moore & Beck (57) ABSTRACT

The invention relates to a method and an apparatus for determination of parameters for a transmission path in a telecommunications system by a transmitting/receiving apparatus having a transmitter and a receiver. In order to determine transmission parameters, a transmission signal is transmitted via the transmission path at a predetermined transmission power level and at a predetermined baud rate ($f_T$) and an echo signal is sampled. A correlation function is calculated from the echo signal and from a correlation signal in a correlation function stage, an envelope function for the correlation function is calculated in an envelope function stage, the envelope function is evaluated, and an output signal is produced as a function of the relative timing and amplitude of the line start echo and/or of the line end echo in an evaluation stage.

18 Claims, 11 Drawing Sheets

FIG 13A Line attenuation

FIG 13B Spectrum of the transmission pulse after the quadruple differentiator

METHOD AND CIRCUIT ARRANGEMENT FOR DETERMINATION OF TRANSMISSION PARAMETERS

FIELD OF THE INVENTION

The present invention relates to the field of telecommunications and more specifically to determination of transmission path characteristics.

DESCRIPTION OF PRIOR ART

U.S. Pat. No. 6,279,022 describes a system for frame synchronization between Asymmetric Digital Subscriber Line (ADSL) transceivers by detection of the boundaries of multitone data symbols which are transmitted between two transceivers. A pulse transmitted by a first transceiver but having a known Fast Fourier Transfer (FFT) is received by a second transceiver. Within the second transceiver, the received pulse is shortened with a Finite Impulse Response (FIR) filter to separate adjacent ADSL symbols thereby reducing potential inter-symbol interference. The boundaries of the received symbols are then determined. The received symbol signal is cross-correlated with the known FFT of the transmitted symbol signal to define a boundary detection function used to define a window for a received symbol of interest. By properly defining the window, energy from the received symbol of interest is maximized while interference from adjacent symbols is minimized.

A test layout using a time domain reflectometer is described in Kummer "Grundlagen der Mikrowellentechnik" [Principles of microwave technology], Chapter 9.4.2.5, pages 383 –385, 1st edition, published by VEB Verlag Technik, Berlin.

DE 695 21 169 T2 describes a system and a method for discrete radar identification, with a multicarrier signal being transmitted repeatedly over two or more periods, and with matched filtering being carried out on reception. The multicarrier signal is of the OFDM type with mutually orthogonal signal carriers.

A system for message transmission by means of radio-frequency phase-distorted pulses is known from Wilhelm Cauer "Theorie der linearen Wechselstrom-Schaltungen" [Theory of linear alternating-current circuits], Akademie-Verlag Berlin, Volume II, 1960, pages 940 –944.

Transmission parameters for a transmission path are normally determined by evaluating the signal which is received after the transmission of specific measurement signals. In this case, both ends of the transmission system must be connected to the measurement device. This is highly complex, particularly for transmission paths with a relatively great physical extent.

Methods are known in which individual pulses are transmitted periodically and the echo signal at the receiver input is sampled in order to determine the echo impulse response. The desired line parameters can be derived from the echo impulse response by means of optimization methods.

Since the optimization methods are highly complex, they are used only in situations which justify this complexity.

SUMMARY OF THE INVENTION

The object of the present invention is to specify a method and to provide a circuit arrangement in order to determine transmission parameters such as the signal propagation time, the line length and the line attenuation, from the echo impulse response.

The measured echo impulse response is likewise used as the basis for the method according to the invention. The method according to the invention for determination of parameters for a transmission path in a telecommunications system by a transmitting/receiving apparatus having a transmitter and a receiver, having the following steps: transmission of a transmission signal with at least one individual pulse by the transmitter via the transmission path at a predetermined transmission power level and at a predetermined baud rate, sampling of an echo signal in the receiver, with the echo signal having at least one echo component of the transmission signal from a line start of the transmission path and having an echo component of the transmission signal from a line end of the transmission path, is distinguished by the following steps: shortening of the line start echo and of the line end echo by means of a shortening filter, calculation of a correlation function from the echo signal and from a correlation signal in a correlation function stage, calculation of an envelope function for the correlation function in an envelope function stage, evaluation of the envelope function and production of an output signal as a function of the relative timing and amplitude of the line start echo and/or of the line end echo in an evaluation stage.

In this case, the correlation signal may be the transmission signal (cross-correlation) or the echo signal (autocorrelation).

The envelope function for the correlation function is preferably calculated with the aid of the Hilbert transformation of the transmission signal. It is particularly preferable to calculate the Hilbert transformation by means of an FFT (Fast Fourier Transformation) and an IFFT (inverse FFT).

In particular, an even-numbered power of the envelope of the correlation function is used as the envelope function, and the evaluation comprises the determination of maxima of the envelope function (for determination of the attenuation) and its time coordinates (for determination of the propagation time and thus the line length).

In one particularly preferred embodiment, the shortening filter is a differentiator, whose transfer function is:

$$H(z) = (1 - z^{-1})^n$$

where z is a complex frequency parameter which is defined as $$z = e^{j \cdot 2 \cdot \pi \cdot \frac{f}{f_A}}$$

where $f_A$ is the sampling frequency of the echo signal and is an integer multiple of the predetermined baud rate $f_T$.

In order to make it possible to derive the attenuation of the echo directly from the maximum of the envelope, the correlation function is preferably normalized with respect to the transmission power of the transmission signal.

In order to reduce the random error in the measurement, the transmission signal in a further preferred embodiment of the invention has a large number of individual pulses, and the echo signals are averaged for each of the individual pulses in the transmission signal.

As an alternative to the values of the echo impulse response being recorded from a specific measurement, that is to say by periodic transmission of an individual pulse, sampling and averaging over a large number of individual pulses, the values can also be determined by evaluation of the coefficients of any echo compensator which the transmitting/receiving apparatus may have.

The corresponding transmitting/receiving apparatus for determination of parameters for a transmission path in a telecommunications system having a transmitter and a receiver is distinguished by a shortening filter for shortening the line start echo and the line end echo, a correlation function stage for calculation of a correlation function from the echo signal and from a correlation signal, an envelope function stage for calculation of an envelope function for the correlation function, and an evaluation stage for evaluation of the envelope function and for production of an output signal as a function of the relative timing and amplitude of the line start echo and/or the line end echo.

In this case, the shortening filter may have two differentiator elements, one of which is an element of the transmitter, and the other is an element of the receiver.

The envelope function stage preferably comprises a recursive quadrature network for carrying out a Hilbert transformation, which quadrature network comprises two digital recursive filters.

In particular, the digital filters are all-pass filters, which have an essentially constant phase difference of 90° in a predetermined frequency range.

In an alternative embodiment of the transmitting/receiving apparatus, the envelope function stage comprises a non-recursive filter with linear phase for carrying out a Hilbert transformation, by means of which a signal whose phase is shifted through 90° with respect to the original signal is produced, which signal is used together with the original signal in order to produce an envelope function.

In order to reduce the signal noise and to improve the timing accuracy for the evaluation process, the evaluation stage is, in a further preferred embodiment, preceded by a comb filter of a predetermined order, whose transfer function is:

$$H_{int}(z) = \left(\frac{1}{m} \cdot \frac{1-z^{-m}}{1-z^{-1}}\right)^n.$$

where z represents a complex frequency parameter as a function of the output frequency, in accordance with:

$$z = e^{j \cdot 2\pi \cdot \frac{f}{m \cdot f_A}}$$

and n is the order of the comb filter.

One advantage of the invention is that the most important transmission parameters can be determined by evaluation solely of the echo signal which is received at the line start. In this case, the line end is preferably left unconnected (open circuit). The signal propagation time and the line attenuation can be determined. If the wave propagation speed in the relevant cable is known, the line length can also be calculated from the signal propagation time. In the case of jointed lines, the position of the joint locations can also be determined. Further features and advantages of the invention will become evident from the following description of exemplary embodiments, with reference being made to the attached drawings, in which:

DETAILED DESCRIPTION

Figure 1:
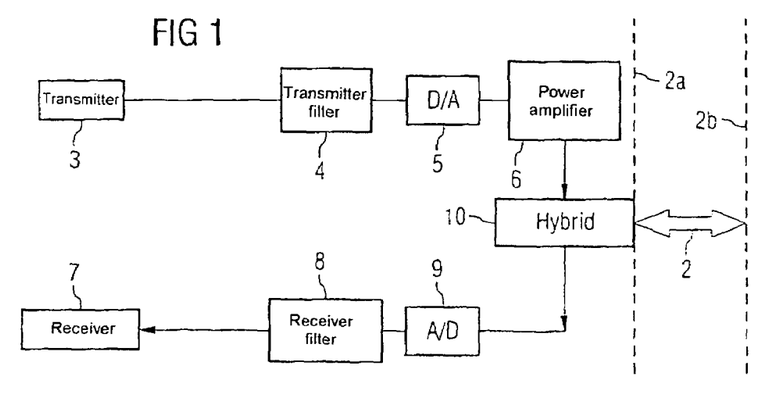
FIG. 1 shows, schematically, the configuration of a transmitting/receiving apparatus (of a transceiver) according to the prior art.

FIG. 1 shows an arrangement of a digital transmitting/receiving apparatus 1 for receiving and for transmitting data via a transmission path 2 according to the prior art. The upper branch of the digital transmitting/receiving apparatus 1 corresponds to the transmitting device, and the lower branch corresponds to the receiving device.

The data (symbols) to be transmitted is filtered in order to achieve a specific spectral form, is converted from digital to analog form, is amplified and is passed to the transmission line 2. For this purpose, the transmitter branch has a transmitter 3, a transmitter filter 4, a D/A converter 5 and a power amplifier 6.

The received signal is tapped off and, after analog/digital conversion and reception filtering, is passed to the receiver, in which the echo impulse response can be measured when an individual symbol is transmitted. For this purpose, the receiver branch has a receiver 7, a receiver filter 8 and an A/D converter 9.

The interface between the transmitter branch and receiver branch and the transmission path 2 is a hybrid circuit 10, which is located at a line start 2a of the transmission path 2. The transmission path 2 ends at a line end 2b, at which a corresponding digital transmitting/receiving apparatus is located, a switching center, or to which a further transmission path is connected.

The junction between a first propagation medium and a second propagation medium is marked by dashed vertical lines in the figures. When signals pass from one medium to another, the unavoidable differences in the propagation conditions in the two media result in reflections, which lead to one or more signal echoes.

These signal echoes are used in order to determine the characteristics of the propagation media. For this purpose, a test pulse is transmitted and its echo is received, or the echo of the actual transmission signal is received and analyzed. In the former case, the measurement process is preferably repeated periodically, and an averaging process is carried out in the receiver, in order to reduce the statistical error in the measurement result.

Figure 2:
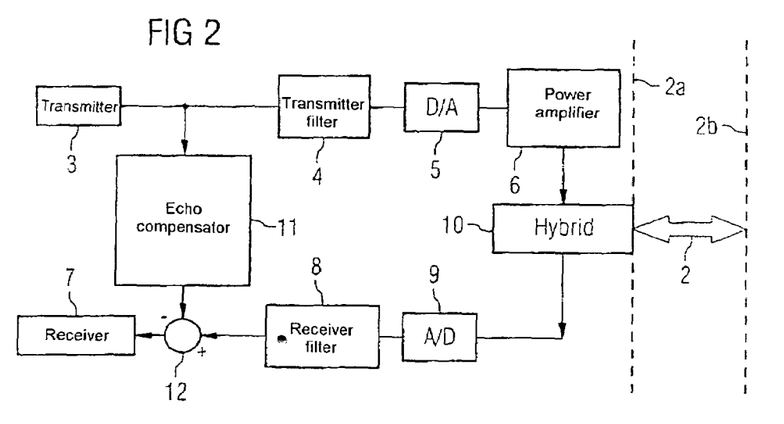
FIG. 2 shows, schematically, the configuration of a transmitting/receiving apparatus with echo compensation according to the prior art.

FIG. 2 shows an arrangement of a transmitting/receiving apparatus which differs from the apparatus shown in FIG. 1 in that it has echo compensation, which is carried out in an echo compensator 11. Apart from this, the elements are the same, are provided with the same reference symbols, and will not be explained once again. In this transmitting/receiving apparatus according to the prior art, the symbols to be transmitted are passed both to the transmission stage and to the echo compensator 11. The estimated signal which is determined in the echo compensator 11 is subtracted in a superimposition element 12 from the received signal. The echo compensator 11 comprises a non-recursive filter (which is not illustrated), whose coefficients are adjusted adaptively after the subtraction formation process, in order to minimize the square of the error. After entering the echo compensator 11, the coefficients of the echo compensator correspond to the sample values of the echo impulse response. The accuracy in this case depends on the word length of the coefficients and the adjustment time. Stochastic data is preferably transmitted instead of periodic individual pulses for adjustment purposes, as during normal operation. Owing to the high residual echo attenuation that is required during operation with the echo compensator 11, it is thus possible to determine the echo impulse response very accurately.

Figure 3:
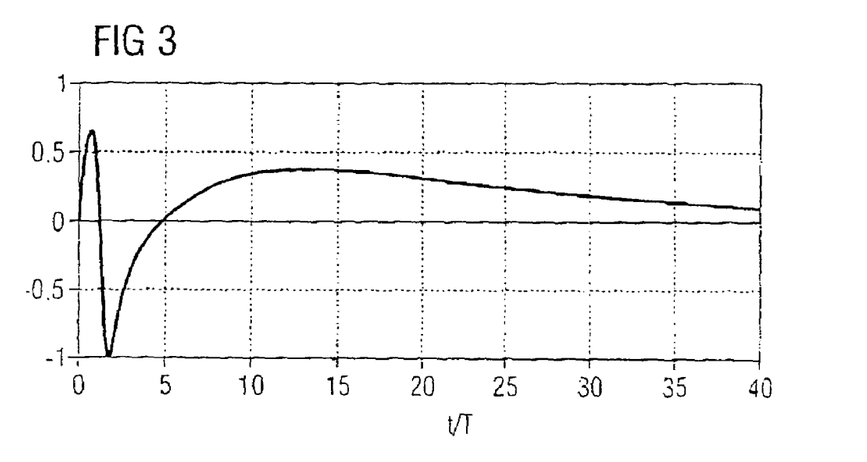
FIG. 3 shows the echo impulse response for a transmitting/receiving apparatus as shown in FIG. 2 with a 3.5 km long line with a diameter of 0.4 mm and a baud rate of 640 kbaud.

FIG. 3 shows the echo impulse response for a system with a 3.5 km long line with a diameter of 0.4 mm, a transformer (which is not illustrated) with a main inductance of 2.5 mH, and a simple bridge hybrid circuit 10.

The following text is based on the assumption that a transmission signal is transmitted at a symbol rate of 640 kbaud. The echo impulse response to this transmission signal in principle comprises two components, to be precise the component which is produced directly at the line start 2a (near-end echo) and a component which is reflected from the line end 2b (far-end echo).

The echo impulse response is shown in FIG. 3. This shows only the line start echo, since the line start echo is superimposed on the line end echo owing to the long time for which it persists. Thus, in the arrangement according to the prior art and as shown in FIG. 1 and FIG. 2, it is impossible to separate the two components in time.

The separation of the line end echo from the line start echo is made more difficult by the fact that the line start echo is reduced by the hybrid circuit 10, while there is no influence on the line end echo. Furthermore, the line end echo is attenuated by twice the line attenuation, so that accuracy problems occur, particularly in the case of relatively long lines.

In order nevertheless to make it possible to separate them in time, a special filter is, according to the invention, inserted in the echo signal branch. This may be a single filter either in the transmitter or in the receiver, or a hybrid filter which is split between the transmitter and receiver. The function of this filter is to shorten the echo impulse response from the line start, and this is therefore referred to in the following text as a shortening filter.

As will be described in the following text, the shortening filter is used to separate the line end echo from the line start echo. The desired parameters for the transmission path 2 can then be determined by evaluation of the timing and amplitude of the line end echo.

Figure 16:
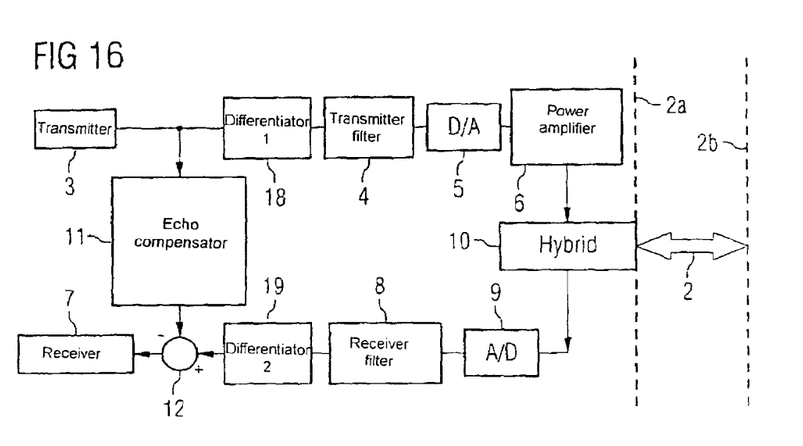
FIG. 16 shows one embodiment of the transmitting/receiving apparatus according to the invention for measurement of the echo impulse response.

FIG. 16 shows one embodiment of the transmitting/receiving apparatus according to the invention, with a shortening filter. In FIG. 16, the shortening filter is a hybrid filter with a first differentiator 18 as an element of the transmitter branch, and a second differentiator 19 as an element of the receiver branch.

The echo shortening filter has the following transfer function:

$$H(z)=(1-z^{-1})^n$$

where z is the complex frequency parameter which is defined as $$z = e^{j \cdot 2 \cdot \pi \cdot \frac{f}{f_A}}$$

where $f_A$ is the sampling frequency of the shortening filter. This must be an integer multiple of the baud rate (symbol rate) at which the transmission signal is transmitted, that is to say the following must be true:

$$f_A = w \cdot f_T.$$

In this case, in the simplest case, w=1.

The shortening filter thus represents an n-tuple differentiator with the sampling frequency $$f_A = w \cdot f_T.$$

Figure 4:
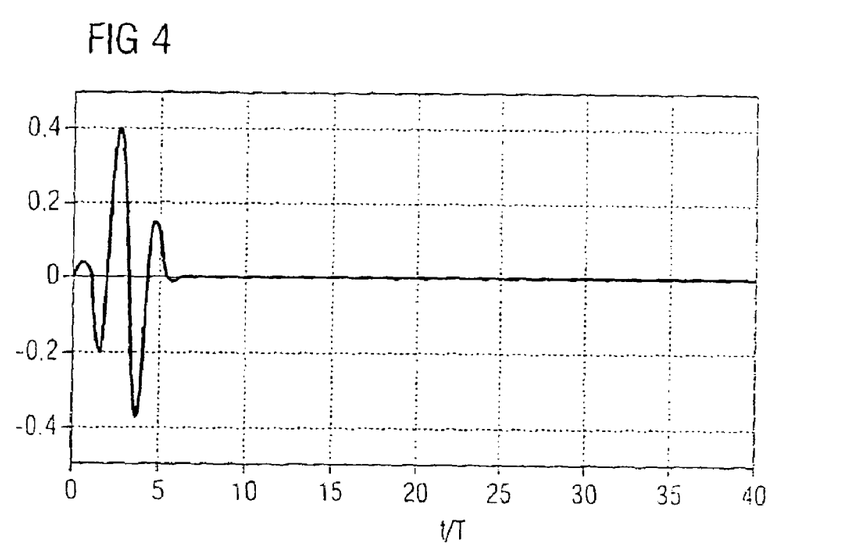
FIG. 4 shows the echo impulse response for a transmitting/receiving apparatus as shown in FIG. 3, but with a quadruple differentiator.

FIG. 4 shows the corresponding echo impulse response with a quadruple differentiator with the sampling frequency being: $f_A = f_T$ (w=1). This clearly shows the influence of the differentiator on the length of the echo impulse response. In this case, it should be noted that the transmission pulse is first of all lengthened in time. The length of the transmission pulse is:

$$L = (n+1) \cdot \frac{T}{W},$$

where T is the symbol duration.

Owing to the severe attenuation of the line end echo, the line end echo of the echo impulse response can likewise not be seen in FIG. 4.

Figure 5:
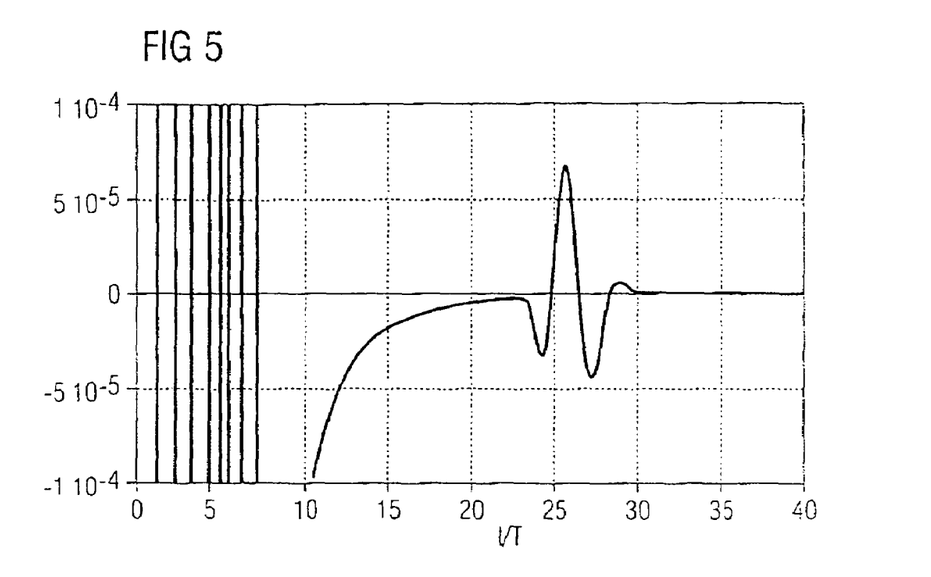
FIG. 5 shows the echo impulse response for a transmitting/receiving apparatus as shown in FIG. 4, magnified 5000 times.

FIG. 5 thus illustrates the echo impulse response once again, magnified 5000 times. This illustration clearly shows the component of the impulse response from the line end.

In order to measure the signal propagation time and, from this and with a knowledge of the propagation speed of the signal in the medium of the line length, it is necessary to accurately determine the delay in the impulse response from the line end in comparison to the transmission pulse. The start of the impulse response from the line end cannot, in general, be determined as easily, however, since corruption can occur owing to the sever attenuation. It is thus worthwhile determining the time of the start of the impulse response from the line end on the basis of the correlation function of the echo impulse response with the transmitted transmission pulse.

Figure 6:
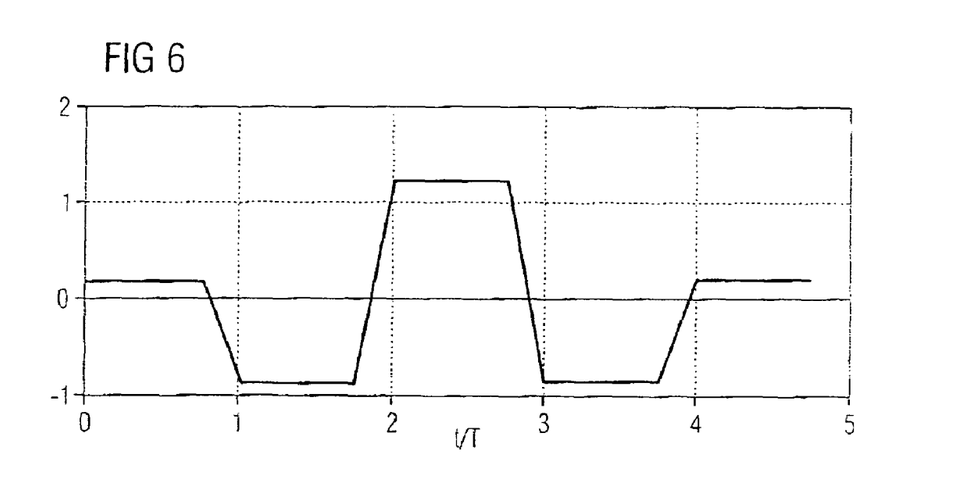
FIG. 6 shows the transmission pulse of the differentiator.

FIG. 6 shows the transmission pulse of the quadruple differentiator with the sampling frequency $f_A=f_T$, with four sample values of each signal being considered at the output of the differentiator. This corresponds to a sampling frequency for the echo impulse response of $f_A=4 \cdot f_T$. The amplitude is in this case normalized such that it corresponds to the actually transmitted transmission power.

Figure 7A:
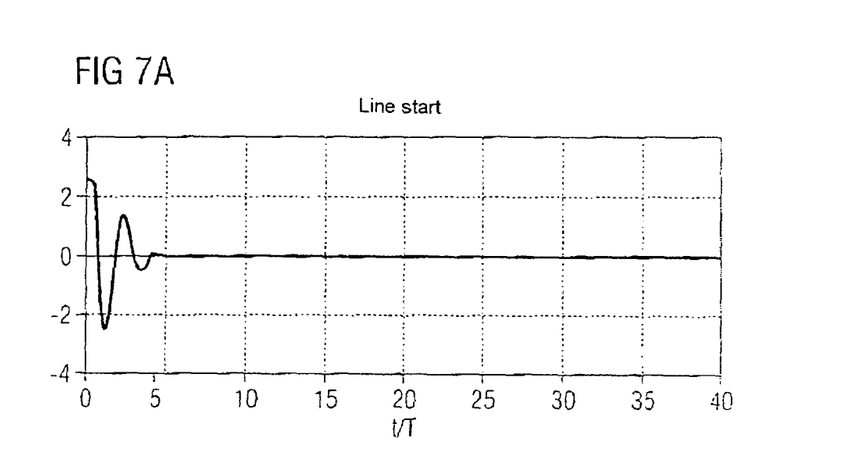
FIGS. 7A and 7B show the cross-correlation function of the echo impulse response and transmission pulse for the line start and for the line end, respectively.
Figure 7B:
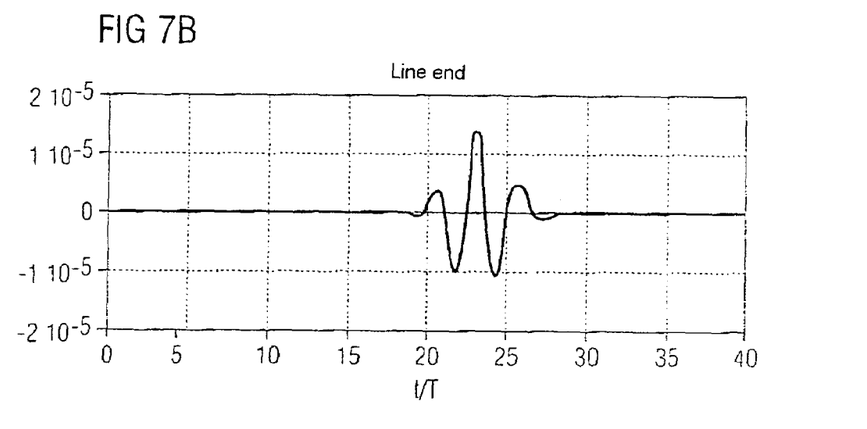

The cross-correlation function for the echo impulse response with the transmission pulse is shown in FIGS. 7A and 7B. In this case, FIG. 7A shows the correlation of the transmission pulse with the echo impulse response from the line start, and FIG. 7B shows the correlation of the transmission pulse with the echo impulse response from the line end.

In this case, the cross-correlation function for two numerical sequences $X_k$ and $y_k$ is defined as $$KKF(k) = \frac{1}{N} \cdot \sum_{K=0}^{N} x_K \cdot y_{K+k},$$

and $X_k$ and $Y_k$ are the values of the transmission pulse and, respectively, of the echo impulse response from the line end.

In order to determine the signal propagation time, the timing and the absolute delay of the local maximum in the cross-correlation function between the echo impulse response and the transmission pulse must now be determined for the line start 2a and for the line end 2b.

If, in contrast, the aim is to determine only the propagation time, then the autocorrelation function of the echo impulse response may also be used instead of the cross-correlation function. The autocorrelation function for the numerical sequence $X_k$ is in this case defined as follows:

$$AKF(k) = \frac{1}{N} \cdot \sum_{K=0}^{N} x_K \cdot x_{K+k},$$

where $X_k$ are the values of the echo impulse response from the line end.

Owing to the propagation time distortion on the line, and if there is any reflection at the line end, it may not always be possible to locate the actual maximum with sufficient accuracy. This is particularly difficult in the case of a jointed line, in which multiple reflections occur so that it is necessary to find the timings of two or more maxima.

In one preferred embodiment of the invention, rather than using the cross-correlation function or the autocorrelation function itself, its envelope or the square of the envelope is used in order to locate the maximum better.

The envelope of a pulse x(t) can be determined as follows:

$$e(t)=\sqrt{x(t)^2+(H(x(t)))^2}.$$

In this case, H(x(t)) denotes the Hilbert transform of the pulse x(t).

For simplicity, the square of the envelope can be used for evaluation of the echo pulse from the line end:

$$e(t)^2=x(t)^2+(H(x(t)))^2.$$

Figure 8A:
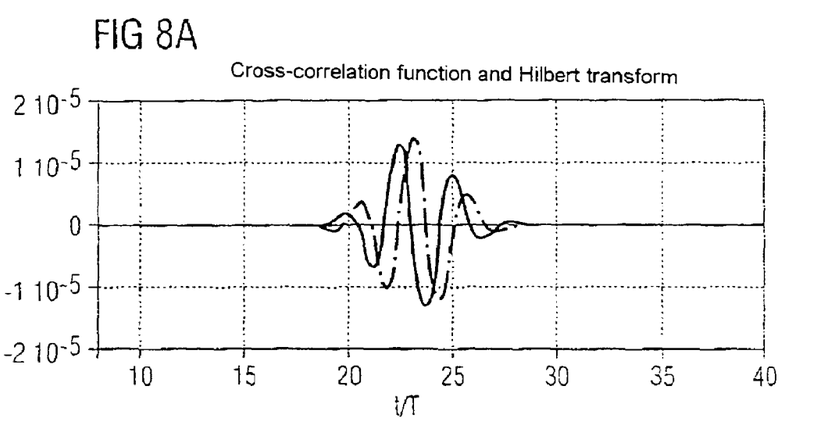
FIGS. 8A and 8B show diagrams of the cross-correlation function and of the Hilbert transform and, respectively, the square of the cross-correlation function.
Figure 8B:
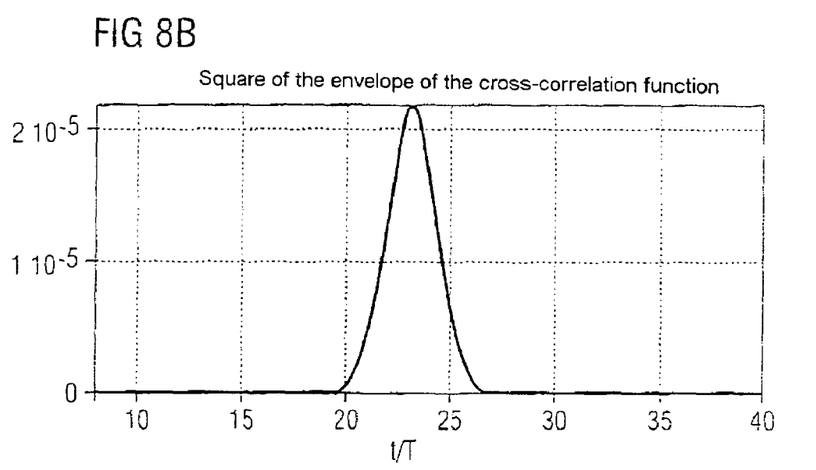

FIGS. 8A and 8B show auxiliary functions for the example used so far of a line with a length of 3.5 km and a diameter of 0.4 mm, recorded using a symbol rate of 640 kbaud and a differentiator for which n=4 and w=1. FIG. 8A shows the cross-correlation function of the transmission pulse and the echo pulse from the line end, as well as their Hilbert transform.

FIG. 8B shows the square of the corresponding envelope. The timing of the maximum of the envelope corresponds to the echo propagation time from the line end. The line propagation time is obtained by halving the echo propagation time, since the line is passed through twice.

It is obvious that the maximum can be determined more easily in FIG. 8B than in FIG. 8A.

If the cross-correlation function is normalized with respect to the transmission power of the transmission pulse, then the attenuation of the echo can be derived directly from the maximum of the envelope. The line attenuation in this case corresponds to half the echo attenuation:

$$a_{line}=5 \cdot \log(e(t_{max})^2),$$

where $a_{line}$ is the attenuation and $e(t_{max})$ is the value of the envelope at its maximum $t_{max}$.

If a hybrid circuit is not used for the measurement of the echo impulse response, the line attenuation can be determined from the autocorrelation function for the echo impulse response. Otherwise, the line attenuation can be determined only by means of the cross-correlation function for the transmission pulse and the echo pulse from the line end.

The Hilbert transform can be calculated in various ways. Three options are described in the following text.

Figure 9:
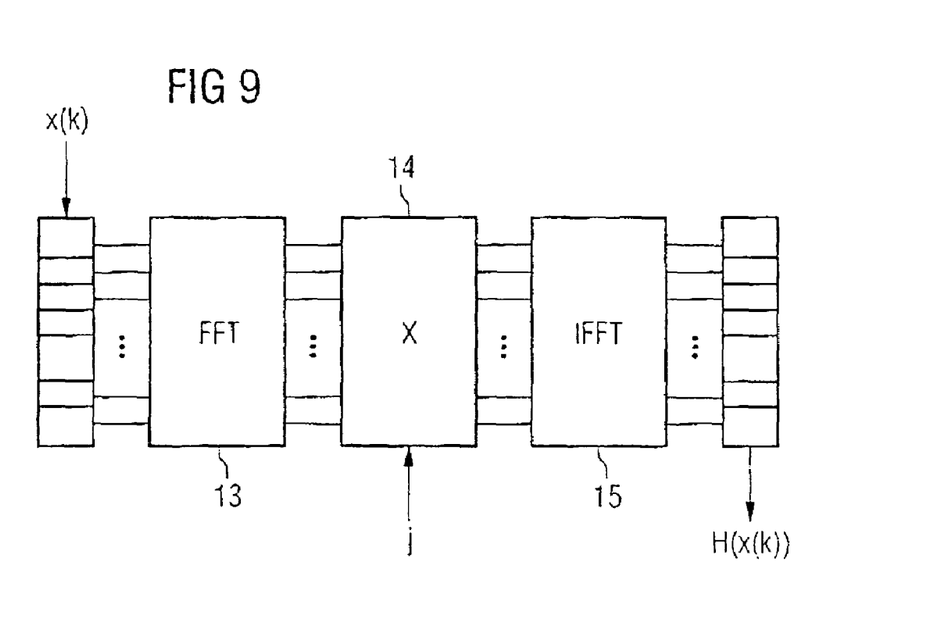
FIG. 9 shows a block diagram for the calculation of the Hilbert transform from the pulse sequence x(k).

In a first preferred embodiment, which is illustrated in FIG. 9, the Hilbert transform is calculated with the aid of Fourier transformations, that is to say by means of FFT and IFFT (Fast Fourier Transformation and inverse FFT). Using x(k) as sample values of the cross-correlation function, the complex frequency values X(i) are in this case obtained by means of a Fourier transformation (in particular FFT) which is carried out in an FFT stage 13. The frequency values are then multiplied in a multiplication stage 14 by the imaginary unit j. Finally, the Hilbert transform H(x(k)) of x(t) is obtained with the aid of an inverse Fourier transformation (in particular an inverse FFT, IFFT), which is carried out in an IFFT stage 15.

Figure 10:
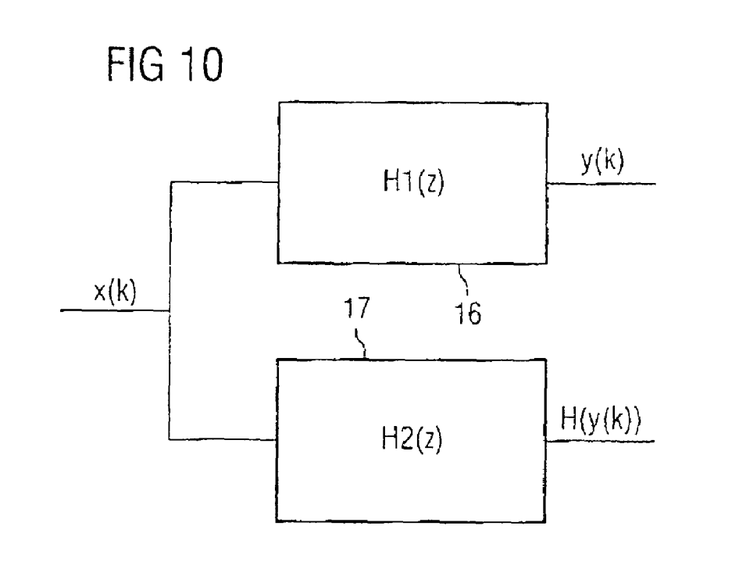
FIG. 10 shows a block diagram for the calculation of the Hilbert transform with the aid of recursive all-pass filters.

In a second preferred embodiment, the Hilbert transformation is calculated using recursive all-pass filters, in particular with the aid of a recursive quadrature network. In this case, the values of x(k) are passed to two digital recursive filters 16 and 17 with the transfer functions H1(z) and H2(z), respectively. The two filters are all-pass filters, which therefore do not influence the magnitude of x(k). The two filters 16 and 17 (H1(z) and H2(z)) are designed so as to produce a constant phase difference of 90° in the frequency range of interest.

The two filters produce a constant signal delay time, which must be taken into account when determining the line propagation time from the timing of the maximum of the envelope.

In one preferred embodiment, the two all-pass filters respectively have the transfer functions:

$$H_1(z) = \frac{a_5 \cdot z^{-5} + a_4 \cdot z^{-4} + a_3 \cdot z^{-3} + a_2 \cdot z^{-2} + a_1 \cdot z^{-1} + a_0}{a_0 \cdot z^{-5} + a_1 \cdot z^{-4} + a_2 \cdot z^{-3} + a_3 \cdot z^{-2} + a_4 \cdot z^{-1} + a_5}$$

and $$H_2(z) = \frac{b_5 \cdot z^{-5} + b_4 \cdot z^{-4} + b_3 \cdot z^{-3} + b_2 \cdot z^{-2} + b_1 \cdot z^{-1} + b_0}{b_0 \cdot z^{-5} + b_1 \cdot z^{-4} + b_2 \cdot z^{-3} + b_3 \cdot z^{-2} + b_4 \cdot z^{-1} + b_5}$$

with the coefficient vectors $$a = \begin{bmatrix} 0.067525 \\ 0.303232 \\ -0.470174 \\ -1.18844 \\ 0.499867 \\ 1 \end{bmatrix} \text{ and } b = \begin{bmatrix} -0.067525 \\ 0.303232 \\ 0.470174 \\ -1.18844 \\ -0.499867 \\ 1 \end{bmatrix}.$$

This results in a sequence of values y(k) at the output of the first filter 16, and the Hilbert transform H(y(k)) is available at the output of the second filter 17.

Figure 11:
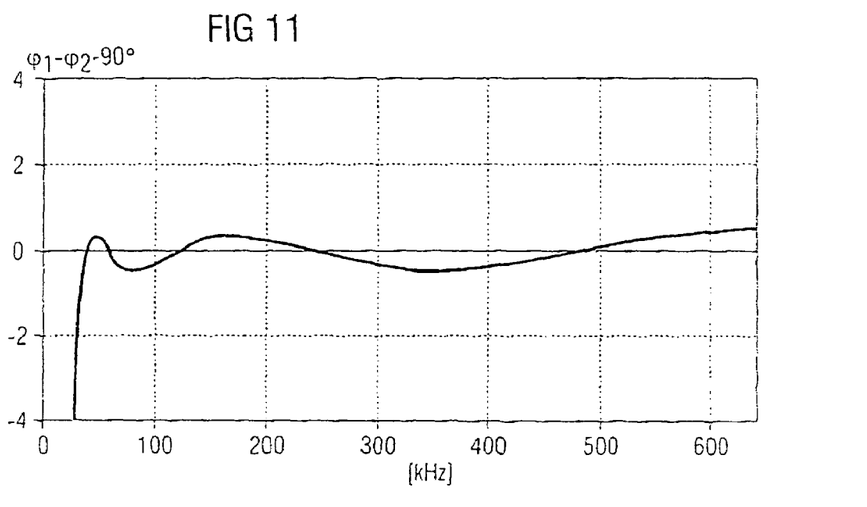
FIG. 11 shows the error of the phase difference of the two filters H1(z) and H2(z) from the nominal difference of 90°.

FIG. 11 shows the error in the phase difference of the filters 16 and 17 from 90° plotted against the frequency. This error is essentially constant and fluctuates only slightly about the zero value.

Figure 12:
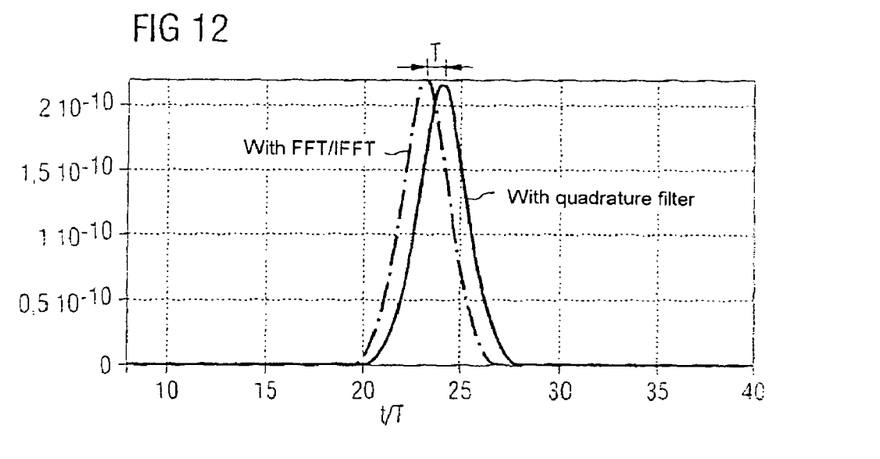
FIG. 12 shows the square of the envelope of the cross-correlation function calculated by means of FFT/IFFT and by means of a quadrature filter.

For comparative purposes, FIG. 12 shows the envelope as calculated using the Fourier transformation and inverse Fourier transformation, alongside the envelope calculated using the quadrature filter.

The envelope which is calculated using the quadrature filter has a delay of about one symbol period in comparison to the envelope calculated using the Fourier transformation and inverse Fourier transformation. This delay time must be taken into account when determining the signal propagation time.

In a third preferred embodiment, the Hilbert transform is calculated using a non-recursive filter with linear phase. The original sequence of the values x(k) is in this embodiment passed to a non-recursive filter, which shifts the phase exactly through 90° for a constant signal propagation Lime. The frequency response for which the amplitude remains constant at the value 1 can be maintained only approximately. The signal filtered in this way and the signal x(k−v) which has been delayed by the constant delay time of the filter are processed further.

Figure 13A:
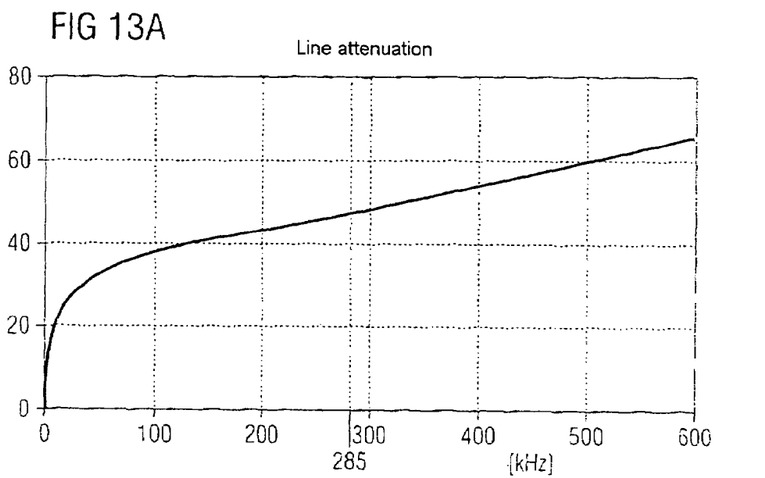
FIGS. 13A and 13B show the line attenuation on a 3.5 km long line with a diameter of 0.4 mm and, respectively, the spectrum of the differentiated transmission pulse.

FIG. 13A shows the theoretical line attenuation of the line from the examples used so far, with a length of 3.5 km and a diameter of 0.4 mm.

Figure 13B:
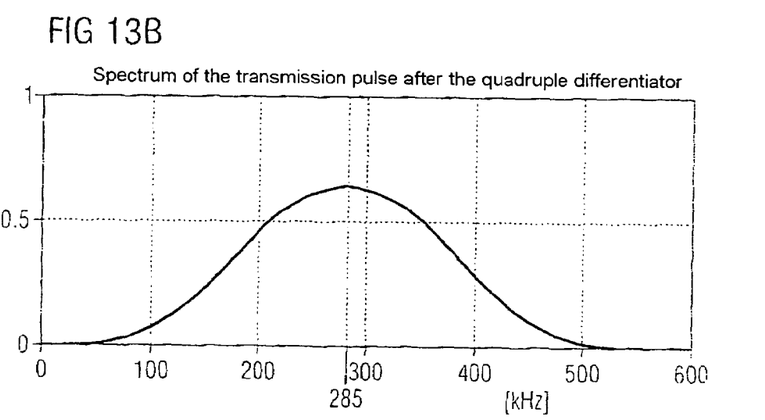

FIG. 13B shows the corresponding signal spectrum for the transmission pulse after the quadruple differentiator. The maximum in the signal spectrum occurs at the frequency of 285 kHz. The line attenuation is in this case 49 dB.

In the following text, this is compared with the values from the calculation of the envelope. The maximum of the square envelope in FIG. 12 is $2.8 \cdot 10^{-10}$. The attenuation is thus:

$$a = -5 \cdot \log(2.8 \cdot 10^{-10}) = 48.3 \text{ dB}.$$

This value provides a very good match with the theoretical line attenuation of 49 dB.

Furthermore, FIG. 12 shows a delay of 23.25 symbol intervals for the envelope. This corresponds to a signal propagation time of:

$$\text{Signal propagation time} = \frac{23.25}{0.64} \cdot 10^{-6} \, s = 36.33 \, \mu s.$$

The line propagation time is thus 18.165 μs. On the assumption that the wave propagation speed in the cable is 65% of the speed of light, that is to say v=195,000 km/s, the line propagation time of 18.165 μs corresponds to a cable length of:

Line length=195000·18.165·$10^{-6}$ km=3.54 km.

This value also provides a very good match with the line length of 3.5 km in the example.

The maximum in the transmission spectrum must be varied appropriately in order to determine the line attenuation for different frequency values. This can be influenced by appropriate adjustment of the symbol rate (in our example 640 kbaud) or else by the choice of the parameters for the differentiator (degree, value of w) If, by way of example, a differentiator is chosen for which n=12, then the maximum in the signal spectrum occurs at 307.5 kHz. A line attenuation of 50.3 dB occurs at this frequency. If the envelope of the cross-correlation function is evaluated, we obtain a value of 50.1 dB, which once again provides a very good match with the actual value.

Figure 14:
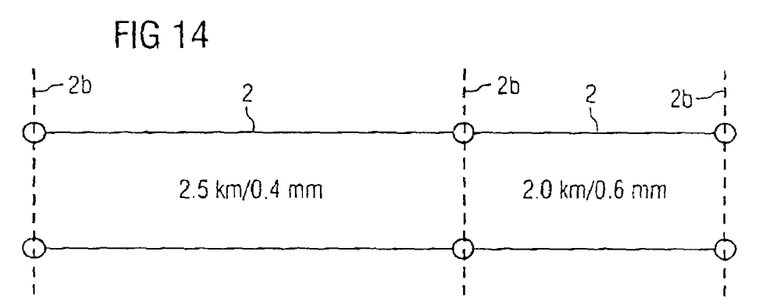
FIG. 14 shows a jointed line.

The method according to the invention is not restricted to homogeneous lines. It can also approximately determine the position of joint locations that exist in a jointed line. A jointed line such as this is shown in FIG. 14. This is composed of two sections 2 between the "line ends" 2b, which are once again marked by dashed vertical lines. In this case, it is assumed that the first section has a length of 2.5 km and a diameter of 0.4 mm, while the second section has a length of 2 km and a diameter of 0.6 mm.

Figure 15:
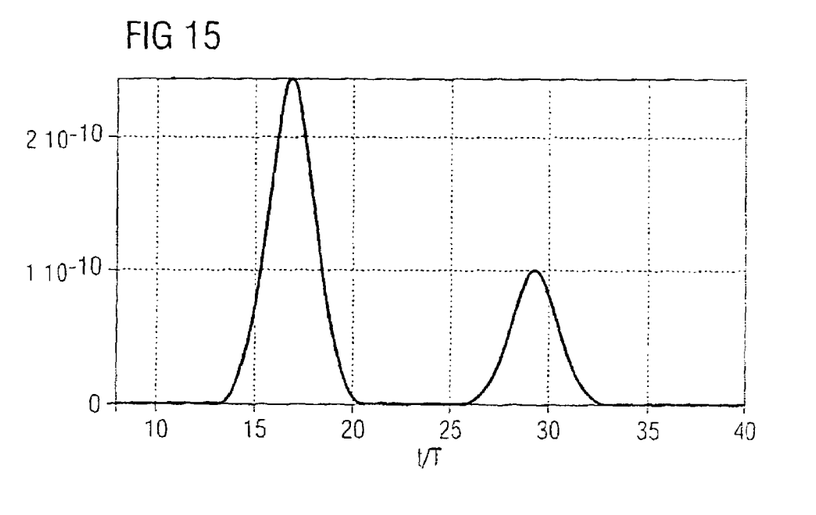
FIG. 15 shows the envelope of the cross-correlation function for a jointed line.

FIG. 15 shows the envelope of the cross-correlation function for a transmission pulse and the echo pulses. This clearly shows the timing of the two reflected echo pulses from the two line ends 2b. The propagation time for the first pulse is 17 symbol intervals, and that for the second pulse is 29.25 symbol intervals. On the assumption that the wave propagation speed is 65% of the speed of light, this results in distances of 2.59 km and 4.46 km. In this case as well, the line length and the position of the joint can thus be stated with relatively high accuracy (error <5%).

In summary, the method according to the invention comprises, as its major components, the modification of the (as far as possible broadband) transmission and reception filters, the differentiation (either only in the transmitter or only in the receiver or split between the transmitter and receiver) as well as the measurement of the echo impulse response, in which case the measurement may comprise either the averaging of the periodically received echo impulse response or the direct reading of the coefficients of the echo compensator. (Impulse responses can also be measured using a higher sampling frequency than the symbol rate by appropriate choice of the sampling phase in the receiver with respect to the sampling phase of the transmission signal).

Figure 17:
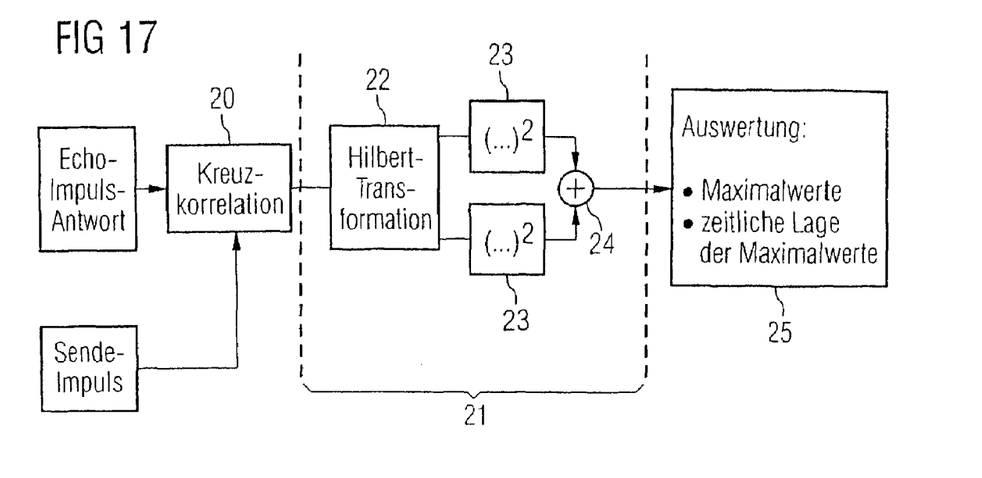
FIG. 17 shows a first embodiment of the circuit arrangement according to the invention for evaluation of the measurement.

The further processing and evaluation of the echo impulse response are preferably carried out with the layout shown in FIG. 17, in which the echo impulse response as well as the transmission pulse are fed into a cross-correlation stage 20, in which the cross-correlation function is calculated for the echo pulse and for the transmission pulse (alternatively, the autocorrelation function is calculated for the echo pulse). In order to determine propagation times more easily, the square of the envelope of the cross-correlation function or of the autocorrelation function is calculated in the subsequent envelope function stage 21 with the aid of Hilbert transformation, with the Hilbert transform being formed in the Hilbert transformation stage 22, and the square of the Hilbert transform from the line start 2a and the line end 2b being formed in a respective quadrature element 23. The two output signals from the quadrature elements 23 are added in a second superimposition element 24 and, finally, are fed into an evaluation stage 25 for evaluation of the envelope. The evaluation of the envelope comprises determination of the maximum values of the echo from the line end, from which the line attenuation is obtained, and the determination of the timing of the echo from the line end, from which the line propagation time and thus the line length are obtained.

Figure 18:
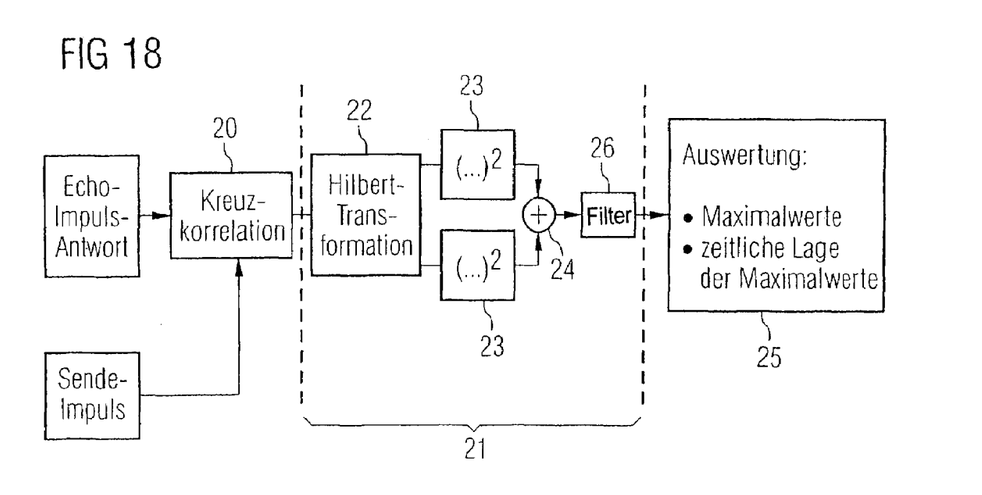
FIG. 18 shows a second embodiment of the circuit arrangement according to the invention for evaluation of the measurement.

FIG. 18 shows an embodiment of the circuit arrangement in which signal noise is suppressed better, and the accuracy for the evaluation process is better than that shown in FIG. 17. This improvement is achieved by means of an interpolation filter 26 upstream of the evaluation stage 25.

The envelope function determined using the sampling frequency $w \cdot f_T$ is passed after the quadrature elements 23 to the filter stage 26, which represents a low-pass filter which suppresses relatively high frequency interference components downstream from the quadrature elements 23. Furthermore, the time resolution can be improved by appropriate choice of the sampling frequency of the filter. For practical implementation, it is worthwhile choosing an integer multiple $m \cdot f_A$ of the sampling frequency of the input signal for the sampling frequency $f_A$ at the output of the interpolation filter 26.

These conditions are satisfied particularly well by a comb filter. If the sampling rate is increased by m times, this results in the interpolation filter having the following transfer function:

$$H_{int}(z) = \left( \frac{1}{m} \cdot \frac{1-z^{-m}}{1-z^{-1}} \right)^n.$$

In this case, z represents the complex frequency parameter corresponding to the output frequency $$z = e^{j \cdot 2 \cdot \pi \cdot \frac{f}{m \cdot f_A}},$$

where n is the order of the comb filter.

The input frequency of the comb filter 26 is thus $f_A$, while the input frequency of the evaluation stage 25 (output frequency of the comb filter 26) is $m \cdot f_A$.

While this invention has been described in terms of several preferred embodiments, there are alterations, permutations, and equivalents which fall within the scope of this invention. It should also be noted that there are many alternative ways of implementing the methods and systems of the present invention. It is therefore intended

The invention claimed is:

1. A method of determining at least one transmission path parameter, based upon an echo signal corresponding to a transmission signal, the echo signal having a line start echo component and a line end echo component, the method comprising the steps of:

filtering to reduce a length of at least one of the line start echo component and the line end echo component;

calculating a correlation function based on the echo signal and a correlation signal;

determining an envelope function for the correlation function;

evaluating the envelope function; and generating an output signal based upon the envelope function, the output indicative of at least one transmission path parameter.

2. The method of claim 1, wherein the step of calculating the correlation function further comprises employing the transmission signal as the correlation signal.

3. The method of claim 2, wherein the step of calculating the correlation function further comprises:

normalizing the transmission power of the transmission signal.

4. The method of claim 1, wherein the step of calculating the correlation function further comprises employing the echo signal as the correlation signal.

5. The method of claim 1, wherein the step of determining the envelope function further comprises performing a Hilbert transformation.

6. The method of claim 5, wherein performing the Hilbert transformation further comprises;

performing a Fast Fourier Transformation; and performing an Inverse Fast Fourier Transformation.

7. The method of claim 1, wherein the step of generating the output signal further comprises determining at least one time coordinate of the envelope function; and generating an output indicative of the at least one time coordinate of the envelope function.

8. The method of claim 1, wherein the step of generating the output signal further comprises:

determining at least one maximum of the envelope function; and generating an output indicative of the at least one maximum.

9. The method of claim 1, wherein the step of generating the output signal further compnses:

determining a plurality of maxima of the envelope function;

determining a plurality of time coordinates of the envelope function; and generating an output indicative of the plurality of maxima and the plurality of time coordinates of the envelope function.

10. The method of claim 9, wherein the step of determining the envelope function comprises:

calculating an envelope function that is a square power of the envelope of the correlation function.

11. The method of claim 1, wherein the step of filtering further comprises filtering to reduce the length of the line start echo and filtering to reduce the length of the line end echo.

12. The method of claim 1, wherein the step of filtering comprises the step of:

shortening the line start echo with a differentiator having a transfer function defined by the equation $$H(z) = (1-z^{-1})^n$$

where z is a complex frequency parameter defined as $$z = e^{j \cdot 2 \cdot \pi \cdot \frac{f}{m \cdot f_A}}$$

where $f_A$ is the sampling frequency of the echo signal and is an integer multiple of a predetermined baud rate.

13. The method of claim 1, wherein the echo signal comprises a plurality of echo pulses, and wherein the step of calculating the correlation function for the echo signal comprises the step of:

averaging the plurality of echo pulses.

14. An apparatus for determining at least one transmission path parameter of a transceiver having a transmit side and a receive side, the apparatus comprising:

a shortening filter operably connected to the transceiver to shorten aspects of an echo signal;

a correlation function stage operably connected to the receive side to correlate the echo signal and a correlation signal;

an envelope function stage operably connected to the correlation function stage to calculate the envelope of the correlation signed; and an evaluation stage operably connected to the envelope function stage to generate an output signal, indicative of at least one transmission path parameter.

15. The apparatus of claim 14, wherein the shortening filter comprises:

a first differentiator operably connected to the transmit side of the transceiver; and a second differentiator operably connected to the receive side of the transceiver.

16. The apparatus of claim 14, wherein the envelope function stage comprises:

a recursive quadrature network having a first and a second digital recursive filter.

17. The apparatus of claim 16, wherein the first and the second digital recursive filter each comprise an all pass filter having a phase difference of about 90 degrees in a frequency band comprising the frequency of the echo signal.

18. The apparatus of claim 14, wherein the envelope function stage comprises:

a non-recursive filter with linear phase.

* * * * *